Feb. 13, 1962 E. F. KINGSBURY 3,020,792
REFLECTOR OPTICAL SYSTEM
Filed Sept. 23, 1947 2 Sheets-Sheet 1
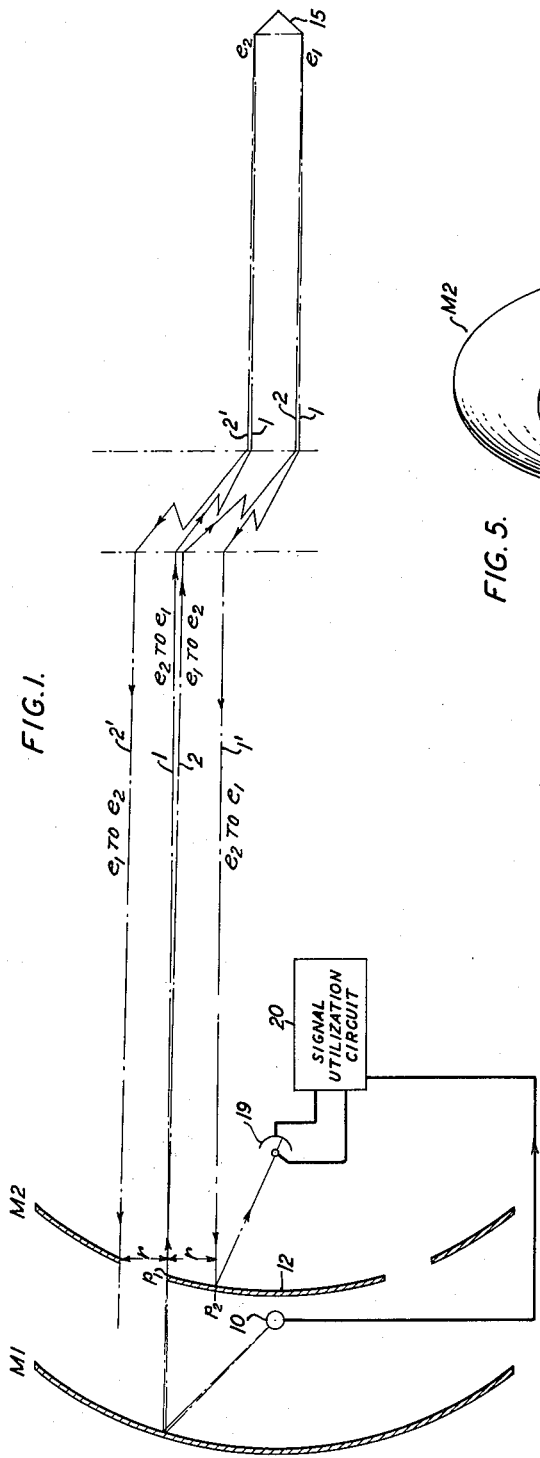
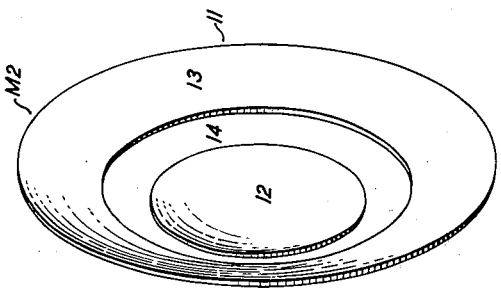
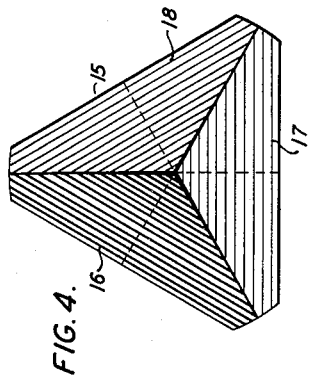
INVENTOR
E. F. KINGSBURY
BY
Hugh S. Wertz
ATTORNEY Feb. 13, 1962   E. F. KINGSBURY   3,020,792
REFLECTOR OPTICAL SYSTEM
Filed Sept. 23, 1947   2 Sheets-Sheet 2

INVENTOR
E.F. KINGSBURY
BY
Hugh S. Wertz
ATTORNEY

United States Patent Office 3,020,792
Patented Feb. 13, 1962

3,020,792
REFLECTOR OPTICAL SYSTEM
Edwin F. Kingsbury, Rutherford, N.J., assignor to Bell Telephone Laboratories, Incorporated, New York, N.Y., a corporation of New York
Filed Sept. 23, 1947, Ser. No. 775,695
3 Claims. (Cl. 88—1)

This invention relates to optical systems and more specifically to systems of this type suitable for object locating and distance measuring systems employing light.

The term "light" as used herein is descriptive of radiations from both the visible and invisible portions of the spectrum. While the invention will be described below with particular reference to an arrangement employing visible or invisible light radiations, it is to be understood that in certain of its aspects the invention is not so limited but is applicable to use with other types of radiations. The waves may be of any length which will cause the rays to be rectilinear as the waves travel through the transmitting medium. They may be, for example, heat waves, sound waves or microradio waves. The term "mirror" as used in this application signifies any device for reflecting waves incident thereon. Various forms of mirrors for obtaining desired relationships between incident and reflected waves for different forms of radiating wave energy are known and may be used in practicing the invention as defined in the appended claims. The term "retrodirective reflecting device" as used herein may be defined as a device capable of reflecting a ray of radiating wave energy so that the incident and reflected rays are parallel and spaced apart by a distance not greater than the effective dimension of the device transverse to the rays. A group of such devices may also be used in order to increase the amount of reflected light without appreciably increasing the size of a unit.

In a copending application of E. Bruce, now Patent No. 2,970,310, issued January 31, 1961, an object locating system employing visible or invisible light rays is disclosed. In one embodiment described in the Bruce patent, a light pulse from a flashlamp is reflected by a paraboloidal mirror and directed toward a target which is preferably a retrodirective reflecting device and echoes or reflections therefrom are picked up by a receiver optical system (comprising lenses) and applied to a photomultiplier. The amplified output of the photomultiplier is applied to the vertical deflecting plates of a cathode ray oscilloscope to the horizontal deflecting plates of which is applied a sweep wave initiated by a synchronizing pulse produced at the same time as the light pulse. This synchronizing pulse is also utilized to produce a range mark (indicating distance to the target) as in radar practice. The present invention, in one of its primary aspects, relates to improved optical systems for an object locating and distance measuring system of the type disclosed in the Bruce patent although it is to be understood that the illustrative optical arrangement to be described below is not limited to use in such a system.

It is an object of this invention to provide an improved optical system for object locating and distance measuring systems.

It is another object of this invention to provide an improved optical system utilizing a zoned mirror, that is, a mirror or system of mirrors having zones or strips of different reflective capabilities.

In accordance with a specific illustrative embodiment of the invention, light or other waves from a suitable source are reflected by a first paraboloidal mirror and directed toward a target which is preferably a retrodirective reflecting device and thus reflects some of them back toward the source. In the paths of the reflected rays from both the mirror and the target is a zoned mirror which is preferably paraboloidal and comprises a central reflecting zone and an outer annular reflecting zone spaced from the central zone by a transparent annular zone. The reflecting surfaces of the zoned mirror cause reflections in the direction away from the first paraboloidal mirror. At the focal point of the second paraboloidal mirror (the zoned one) is placed a photocell or photomultiplier cell to pick up those radiations from the source which pass through the annular transparent space between the two reflecting zones of the second paraboloidal mirror and which are reflected back from the retrodirective reflecting device and strike the reflecting zones of the second paraboloidal mirror and are in turn reflected thereby to the photocell or photomultiplier. The signal produced by the photocell or photomultiplier can be utilized by any suitable circuit.

The invention will be more readily understood by referring to the following description taken in connection with the accompanying drawings forming a part thereof in which:

FIG. 1 is a schematic diagram of an optical system suitable for an object locating and distance measuring system employing light radiations;

FIG. 4 is a perspective view of a suitable retrodirective reflecting device; and FIG. 5 is a perspective view of a zoned mirror of the type used in the arrangement of FIG. 1.

Figure 2:
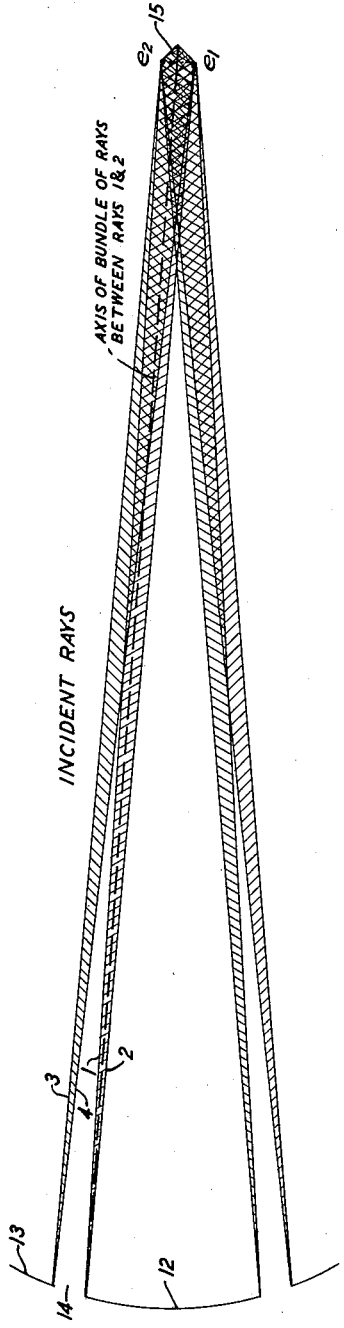
FIGS. 2 and 3 are schematic diagrams (which have been distorted for purposes of better explaining the invention) showing, respectively, certain of the rays incident upon the retrodirective reflecting device in the arrangement of FIG. 1 and the rays reflected therefrom.
Figure 3:
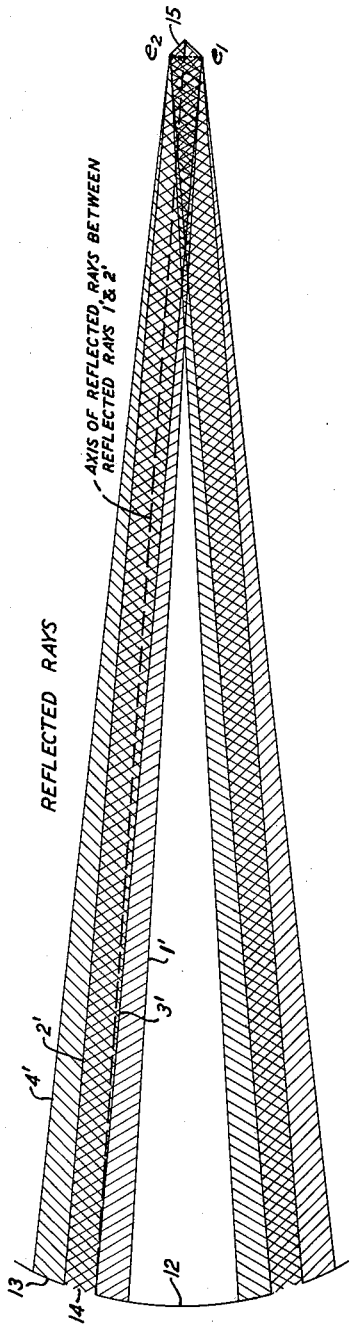

Referring more specifically to the drawings, FIG. 1 shows, by way of example for purposes of illustration, an optical system suitable for an object locating and distance measuring system employing visible or invisible light rays. Preferably infra-red light is used and when this form of light is employed the system is frequently called an "Irrad." Briefly stated, the system comprises a flashlamp 10 mounted between two paraboloidal mirrors M1 and M2, the lamp 10 preferably being placed substantially at the focus of the mirror M1. The mirror M1 is capable of reflecting rays over a large portion of its paraboloidal surface which is without gaps of non-reflecting material therein, but the mirror M2 is of the zoned type, that is, it has portions which are not reflecting and portions that are. By way of example, the mirror M2 comprises a paraboloidal glass member 11 having two spaced coaxial reflecting portions 12 and 13 separated by an annular transparent portion 14 (see FIG. 5). The paraboloidal mirror M1 tends to form radiations from the source 10 (as near a point source as possible) to a beam of parallel rays but due to slight imperfections in the surface thereof and to the fact that the source 10 is not a point source located exactly at the focus of the mirror M1, many of the rays reflected from this mirror are slightly converging. Rays of this type have been indicated in FIG. 2. It is to be understood that the convergence of the rays shown in FIG. 2 is greatly exaggerated so as better to explain the principle of operation of this invetnion. In actual practice, the rays are more nearly parallel than those shown in FIG. 2. The rays shown in this figure converge on a target 15 which has been indicated schematically as a retrodirective reflecting member. A device having the properties of retrodirective reflection is shown in FIG. 4 and comprises three mirrors 16, 17 and 18 each placed at right angles to the other two. Such a triple mirror arrangement and its properties are well known to the workers in the optical art. It is capable of reflecting a ray of light or other wave energy so that the incident and reflected rays are parallel and spaced apart by a distance not greater than the effective dimensions of the device transverse to the rays. This is schematically represented in FIG. 1 where ray 1 is a ray which just clears a point on the circumference of the inner reflecting surface 12 of the mirror M2 and reaches a point $e_2$ at one end of the line of the effective reflecting area of the target 15 in the plane of the drawing while ray 2 is a ray which is also in the plane of FIG. 1 and just reaches the other end of the line of the effective reflecting area of the target 15 in the plane of the drawing. These rays 1 and 2 are also shown in FIG. 2 along with other rays 3 and 4 which just clear a point on the inner circumference of the outer reflecting surface 13 and strike the points $e_2$ and $e_1$, respectively, of the target 15. Rays similar to 1, 2, 3 and 4 pass through the annular transparent surface 14 throughout the entire area thereof. Some of these rays have been indicated in the lower portion of FIG. 2. The ray 1 is reflected back from the target 15 in the form of ray 1′ while the ray 2 is reflected back from the target 15 in the form of a ray 2′. Similarly rays 3 and 4 are reflected back in the form of rays 3′ and 4′, as shown in FIG. 3. As shown in FIG. 1 the ray 1′ strikes the surface 12 at a point $p_2$ from whence it is reflected to the photosensitive device 19 which is preferably a photomultiplier of the type referred to in the abovementioned Bruce patent. The signal produced by the photocell or photomultiplier 19 is connected to a signal utilization circuit 20 which has been shown schematically as a box in the drawing but which may comprise an amplifier for the photomultiplier signal, a cathode ray oscillograph tube and its various auxiliary circuits for applying the amplified signal to one set of deflecting plates in the cathode ray oscillograph tube and a sweep voltage to the other set of deflecting plates therein. If desired, pulses from the lamp 10 may be utilized (as in the Bruce patent) to produce in each case a synchronizing pulse which controls a range unit to generate a range mark pulse which is also applied to the set of deflecting plates to which the amplified echo signal is applied. As the signal utilization circuit 20 forms no part of the present invention, it will not be described in detail but reference is made to the Bruce patent for a more complete description of a suitable signal utilization circuit.

The operation of the optical system shown in FIG. 1 will now be described. The system is adjusted so that all portions of the annular opening in mirror M2 radiate uniformly to the target 15. Thus M2 as viewed from the member 15 would appear to be a uniformly bright annulus. In practice, this optimum reflected signal can be secured by adjusting the mirror M1 and the source 10 until the optimum returned signal is obtained in the zoned mirror and associated photo-electrical system assuming that the latter has been previously adjusted for the proper focal collection. Consider a point $p_1$ at an edge of the luminous zone. In the sectional plane of FIG. 1, two marginal rays proceed therefrom, one to the edge $e_1$, the other to edge $e_2$ of the triple mirror 15. Disregarding atmospheric scattering and constructional errors, it is a property of such a mirror 15 to return a beam back along a path parallel to the incident beam but displaced diametrically with reference to the mirror vertex. The beam which goes from $e_1$ to $e_2$ will return to $p_1$ displaced and lost out from the reflective edge by the distance $r$ which equals the separation of $e_1$ from $e_2$. Likewise the $e_2$ to $e_1$ beam will come back displaced but in the opposite direction and will strike at a distance of $r$ from $p_1$, thereby being reflected to the photocell or photomultiplier 19. All rays within the plane angle $e_1$, $p_1$, $e_2$ will likewise be reflected diametrically and on return either become lost or are reflected to the photo pick-up device 19 at corresponding distances in from the point $p_1$.

If it is considered what happens to the entire bundle in the solid angle determined by the vertex $p_1$ and the area of the target 15, it will be clear that the return beam at the mirror M2 will be within a circle of radius $r$ around $p_1$ and will be approximately half reflected and half lost. Since $p_1$ is any point on the edge of the luminous zone, the projected area of illumination on the inner mirror 12 will be annulus of width $r$ around the circumference. However, the illumination will not be uniform but will be a maximum adjacent to the point $p_1$ and decrease to zero beyond a point $r$ distance away. The intensity distribution of the illumination can be determined as follows: Let point $p_1$ be moved out into the luminous zone away from its edge. In accordance with the principle stated above, at any position the returned beam at M2 is found within a circle of radius $r$ so that if $p_1$ is moved more than that distance away, no point of the inner mirror 12 will be illuminated. Inside of this limit all positions of the point $p_1$ within a radius $r$ of any point $p_m$ on the reflective surface will contribute to the intensity of illumination on it. The locus of effective $p_1$ points will thus be that portion of the circular area of radius $r$ and center $p_m$ overlapping the luminous zone. Furthermore, this area will be proportional to the illumination on $p_m$ if the luminous zone is uniformly filled.

So far nothing has been said concerning the outer reflective zone of the mirror M2. Suppose the points $p_1$ is moved over to the outer end of the luminous zone. It will illuminate a distance of $r$ over the outer mirror and a luminous annulus of the same width will be created as in the former case. The intensity distribution in from the edge will, however, be somewhat different because it is determined in part by the direction and magnitude of the curvature of the boundary between the luminous and reflective zones. The distribution can also be affected by the width of the luminous zone for it one starts with a very narrow one the annulus of width $r$ will be created but the illumination toward the edge cannot rise much. An informative experiment in this connection is the projection on a triple mirror a suitable short distance away of an intense but minute beam through a small hole in a white cardboard. On the cardboard will be seen an image of the triple mirror, uniform in brightness, double in size and with the vertex coinciding with the hole.

As the width of the luminous zone is increased the illumination of the reflective zone increases towards its edge until a maximum is reached when the width of the luminous zone equals $r$. Beyond this no further change in illumination takes place and its efficiency of collection decreases.

The photo pick-up device 19 and the apparatus associated therewith are in front of the dark center of the optical path of the zone mirror M2. The diameter of the receiver plus twice the diameter of the triple mirror 15 should equal the diameter of the inner reflecting surface which obviously need be but an annulus. The receiver diameter plus four times the diameter of the triple mirror equals the outer diameter of the luminous zone and the receiver plus six times the triple mirror equals the outside useful diameter of the mirror M2. As such reflectors are apt to have considerable marginal error some allowance should be made for this in the overall diameter. Some allowance should also be made for beam scattering due to great distances, optical imperfections in the retrodirective reflectors or other causes. When the triple mirror 15 is square to the beam, the effective reflecting surface is actually hexagonal in projection but assuming it circular of equivalent area and having a diameter $r$ introduces little error.

During the operation of the device pulses are produced by the lamp 10 and reflections thereof are produced by the mirror 15, as pointed out above, and certain of these reflections are reflected upon the photo pick-up device 19 to produce echo signals which can be utilized in a device of the type disclosed in detail in the Bruce application. Experiments indicate that more light is projected upon the photo pick-up device 19 using the optical arrangement of FIG. 1 than there is when the optical arrangement described in the Bruce patent (which utilizes lenses) is used since the lens mount cuts off much light.

Although the present invention has been described in terms of preferred illustrative embodiments it should be realized that the invention and its several features are susceptible of embodiment in a wide variety of other forms, hence the invention is to be understood as comprehending such other forms as may fairly come within the spirit and letter of the appended claims. For example, the optical system of FIG. 1 can be utilized with devices other than object locator and distance measuring systems, and moreover the principles of FIG. 1 are applicable to waves, other than light waves, which are of a length which will cause the rays to be rectilinear as the waves travel through the transmitting medium such, for example, as heat waves, sound waves and microradio waves.

What is claimed is:

1. An optical system comprising a first zoned concave mirror having a central reflecting zone and an outer reflecting zone spaced from said central zone by a transparent annular mirror, a second concave mirror substantially parallel to said first concave mirror, means positioned between said concave mirrors for transmitting rays towards said second mirror to cause a portion of the reflected rays therefrom to pass through said transparent annular zone, means positioned in the path of said transmitted rays for reflecting incident radiation so that the incident and reflected rays are parallel and spaced apart by a distance not greater than the effective dimension of the device transverse to the days, said dimension also being the dimension of said transparent annular zone transverse to the transmitted rays, said last-mentioned means comprising a plurality of mutually perpendicular plane mirrors, and means located near the axis of said first concave mirror for collecting rays reflected from said reflecting device and further reflected by said mirror reflecting zone.

2. An optical system comprising a first zoned paraboloidal mirror having a central reflecting zone and an outer reflecting zone spaced from said central zone by a transparent annular zone, a second paraboloidal mirror substantially parallel with said first mirror, a light source positioned between said two mirrors at the focus of said second mirror for transmitting through the transparent zone of said first mirror substantially parallel light rays, a retrodirective reflecting device having three mutually perpendicular reflecting surfaces positioned in the path of said parallel rays, and a photosensitive device positioned at the focus of said first mirror for collecting the rays reflected from said retrodirective device and further reflected by said first mirror.

3. An optical system comprising a first zoned paraboloidal mirror having a central reflecting zone and an outer reflecting zone spaced from said central zone by a transparent annular zone, a second paraboloidal mirror spaced substantially parallel to said first mirror, a light source positioned between said two mirrors at the focus of said second mirror for transmitting through the transparent zone of said first mirror substantially parallel light rays, a retrodirective reflecting device having three mutually perpendicular reflecting surfaces positioned in the path of said light rays and having an effective dimension transverse to the direction of said light rays equal to this same dimension of the transparent zone of said first mirror, and a photosensitive device positioned at the focus of said first mirror for collectnig the rays reflected from said retrodirective device and further reflected by said first mirror.

References Cited in the file of this patent

UNITED STATES PATENTS

| | | |
|---|---|---|
| 897,174 | Straubel | Aug. 25, 1908 |
| 1,384,014 | Fessenden | July 5, 1921 |
| 1,981,492 | Assmus | Nov. 20, 1934 |
| 2,198,014 | Ott | Apr. 23, 1940 |
| 2,336,379 | Warmisham | Dec. 7, 1943 |